(12) United States Patent
Giacalone et al.

(10) Patent No.: US 9,699,068 B1
(45) Date of Patent: Jul. 4, 2017

(54) DISTRIBUTING ROUTING UPDATES ACCORDING TO A DECAY MODE

(71) Applicant: Amazon Technologies, Inc., Seattle, WA (US)

(72) Inventors: Spencer Giacalone, Seattle, WA (US); Alan Michael Judge, Dublin (IE); Stephen Callaghan, Seattle, WA (US); Mark Noel Kelly, Seattle, WA (US); Leonard Thomas Tracy, Bothell, WA (US); Justin Oliver Pietsch, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 187 days.

(21) Appl. No.: 14/502,841

(22) Filed: Sep. 30, 2014

(51) Int. Cl.
  *G06F 15/173* (2006.01)
  *H04L 12/733* (2013.01)
  *H04L 12/721* (2013.01)

(52) U.S. Cl.
  CPC ............ *H04L 45/126* (2013.01); *H04L 45/14* (2013.01)

(58) Field of Classification Search
  CPC ....... H04L 45/00; H04L 45/023; H04L 45/22; H04L 45/48; H04L 67/327
  USPC ...................................................... 709/242
  See application file for complete search history.

(56) References Cited

U.S. PATENT DOCUMENTS

| | | | | |
|---|---|---|---|---|
| 7,430,176 | B2 * | 9/2008 | Nalawade | H04L 45/028 370/238 |
| 7,633,874 | B1 * | 12/2009 | Nalawade | H04L 45/04 370/238 |
| 7,835,312 | B2 * | 11/2010 | Shand | H04L 45/02 370/217 |
| 7,835,953 | B2 * | 11/2010 | Chen | G06Q 10/08 705/28 |
| 7,855,953 | B2 * | 12/2010 | Filsfils | H04L 12/4633 370/228 |
| 2005/0078656 | A1 | 4/2005 | Bryant | |
| 2007/0008953 | A1 | 1/2007 | Wing | |
| 2007/0121524 | A1 * | 5/2007 | Rangarajan | H04L 12/5693 370/252 |

(Continued)

OTHER PUBLICATIONS

Cisco, "Enhanced Interior Gateway Routing Protocol," Document ID: 16406, <http://www.cisco.com/c/en/us/support/docs/ip/enhanced-interior-gateway-routing-protocol-eigrp/16406-eigrp-toc.pdf>, 44 pages (accessed Jul. 8, 2014).

(Continued)

*Primary Examiner* — Phuoc Nguyen
(74) *Attorney, Agent, or Firm* — Klarquist Sparkman, LLP

(57) ABSTRACT

Techniques and solutions for distributing routing updates using timing information are described. For example, inter-device messaging protocols can support timing information (e.g., routing protocols be extended to support timing information). The timing information can indicate a time at which the routing update is to be put into effect where the time decreases the further away a given routing device is from the source of the routing update. For example, each routing device can determine a decayed update reference time when the given routing device will put the routing update into effect according to a decay mode. Routing updates can be managed between routing devices that support timing information and routing devices that do not support timing information.

16 Claims, 14 Drawing Sheets

(56) References Cited

U.S. PATENT DOCUMENTS

2008/0098127 A1* 4/2008 Engel .................. H04L 12/5695
709/238
2011/0238793 A1* 9/2011 Bedare .............. H04L 29/12283
709/220
2013/0201909 A1 8/2013 Bosch

OTHER PUBLICATIONS

Cisco, "Configuring Routing Information Protocol," Cisco IOS IP Configuration Guide Release 12.2, <http://www.cisco.com/c/en/us/td/docshos/12_2/ip/configuration/guide/fipr_c/lcfrip.pdf>, 14 pages (accessed Jul. 8, 2014).
Cisco, "Configuring EIGRP," Cisco IOS IP Configuration Guide Release 12.2, <http://www.cisco.com/c/en/us/td/docshos/12_2/ip/configuration/guide/fipr_c/lcfeigrp.pdf>, 20 pages (accessed Jul. 8, 2014).
Wikipedia, "Border Gateway Protocol," <http://en.wikipedia.org/wiki/Bgp>, 16 pages (accessed Jul. 8, 2014).
Wikipedia, "Open Shortest Path First," <http://en.wikipedia.org/wiki/Ospf>, 16 pages (accessed Jul. 8, 2014).

* cited by examiner

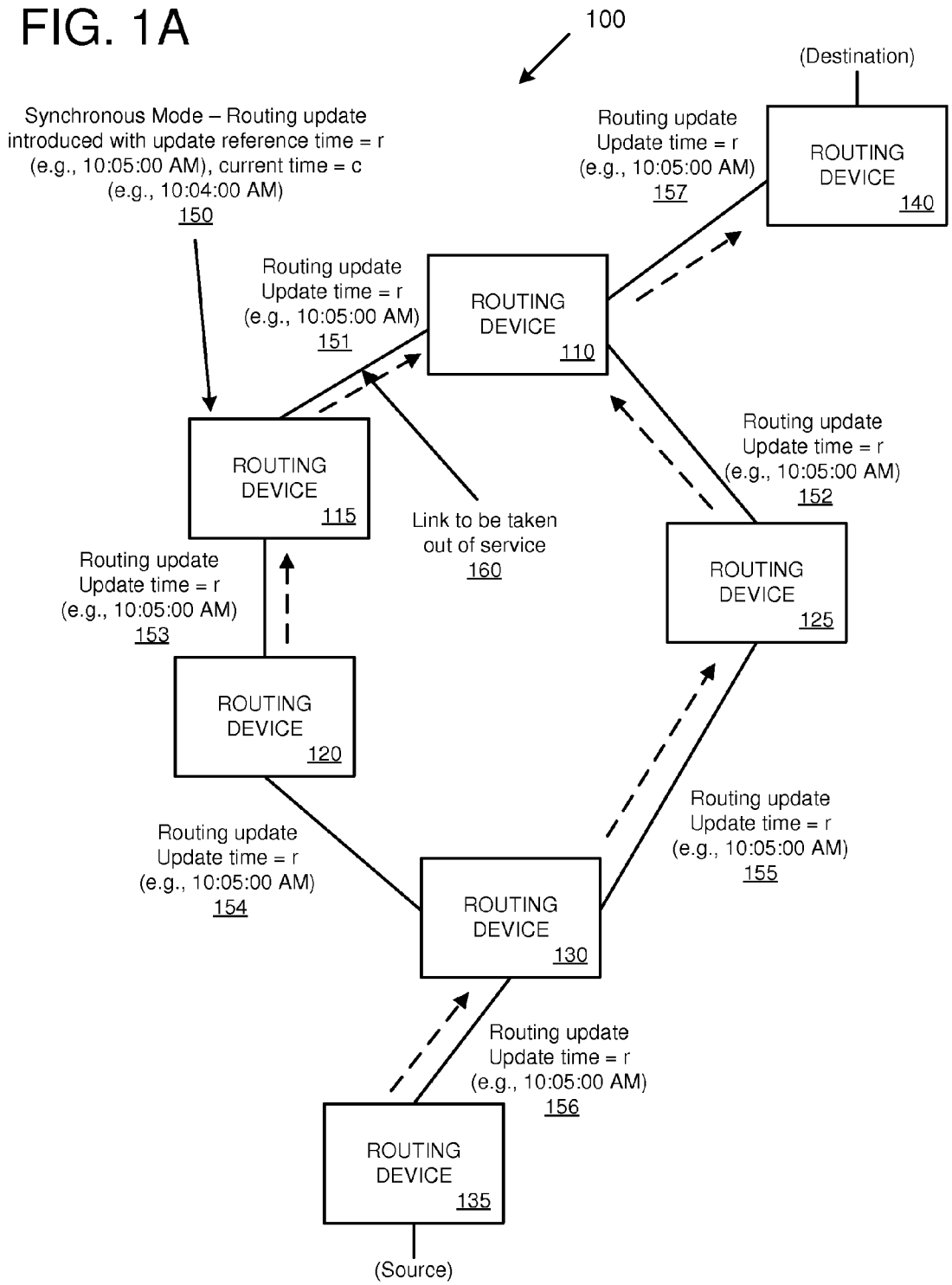

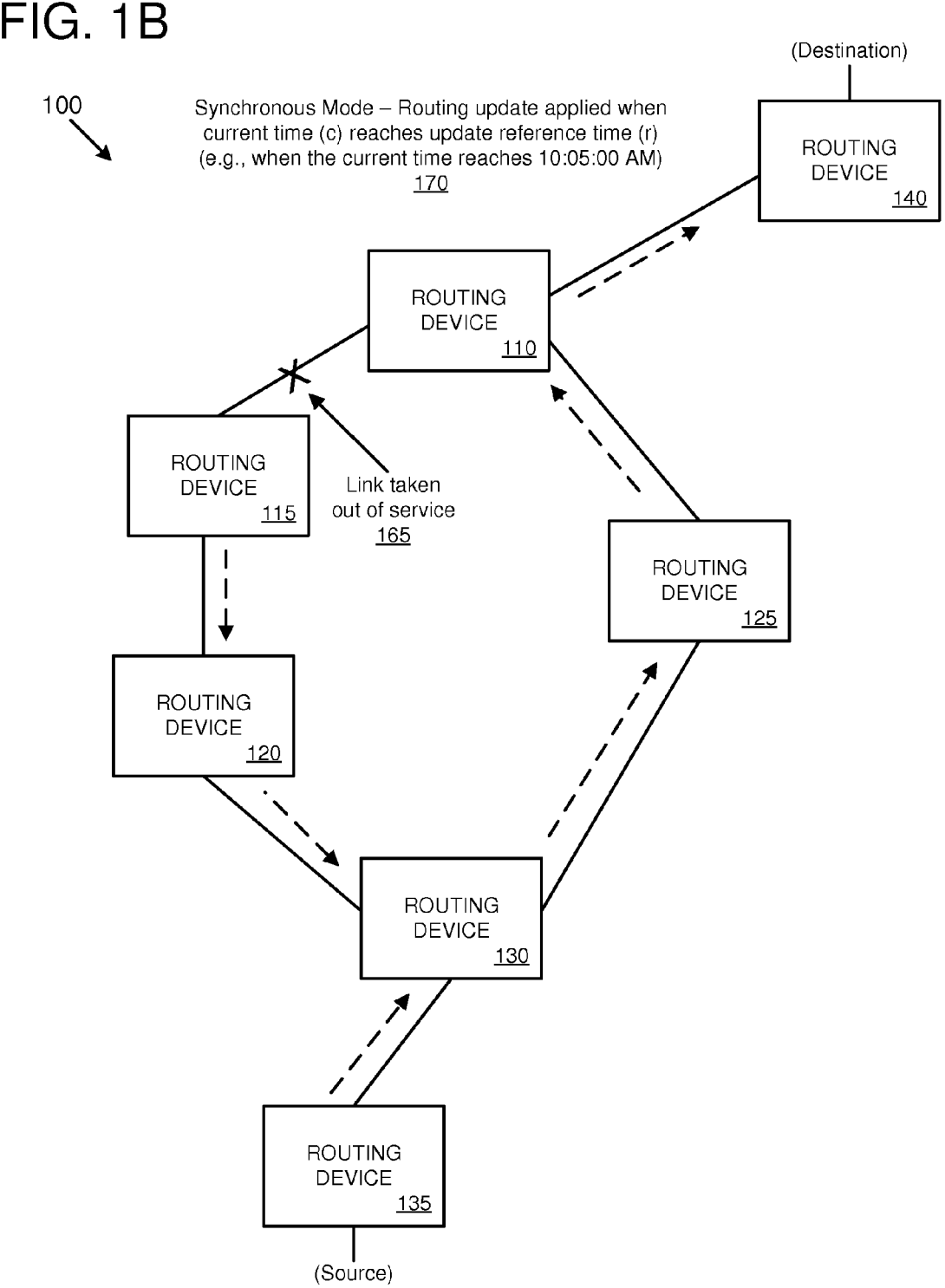

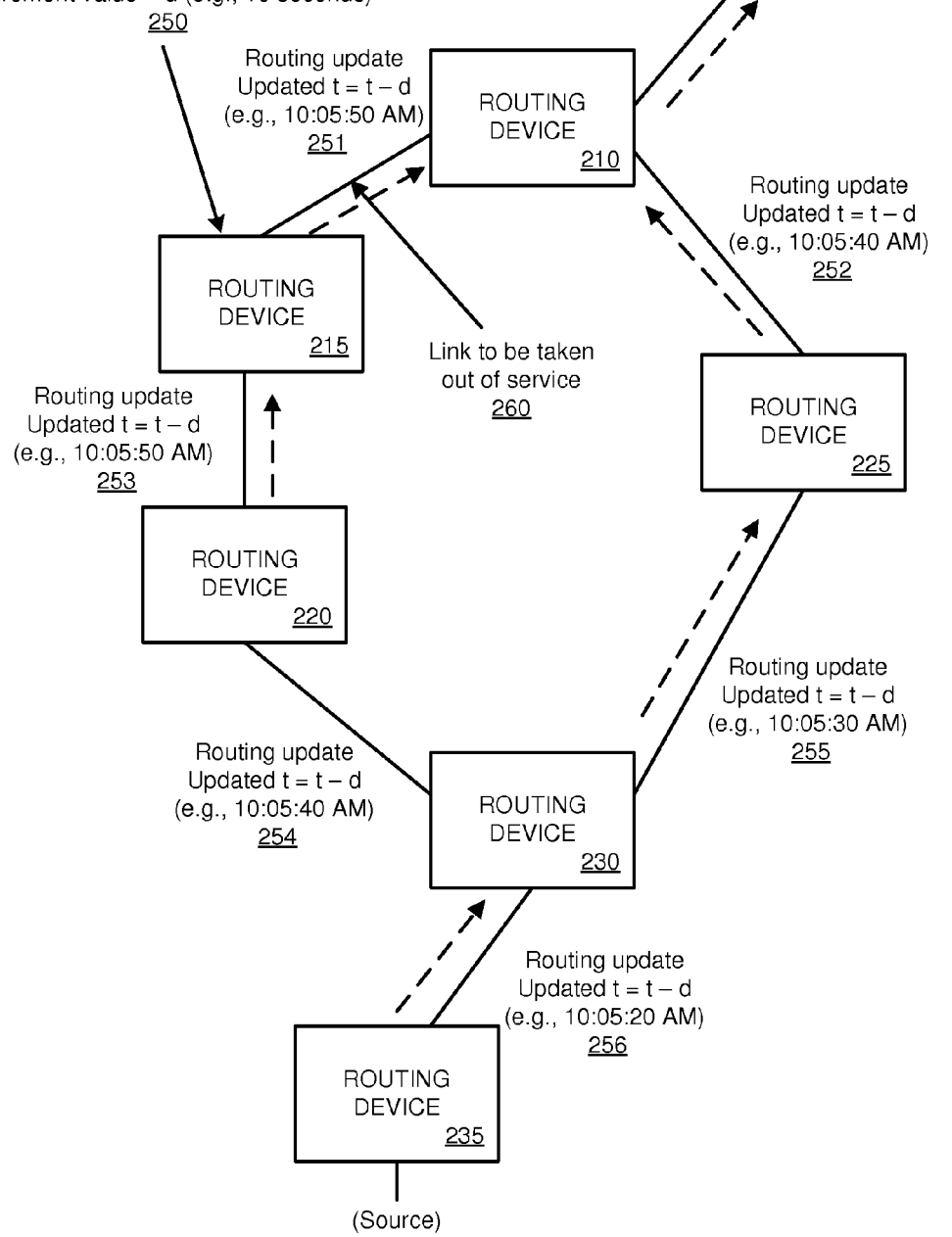

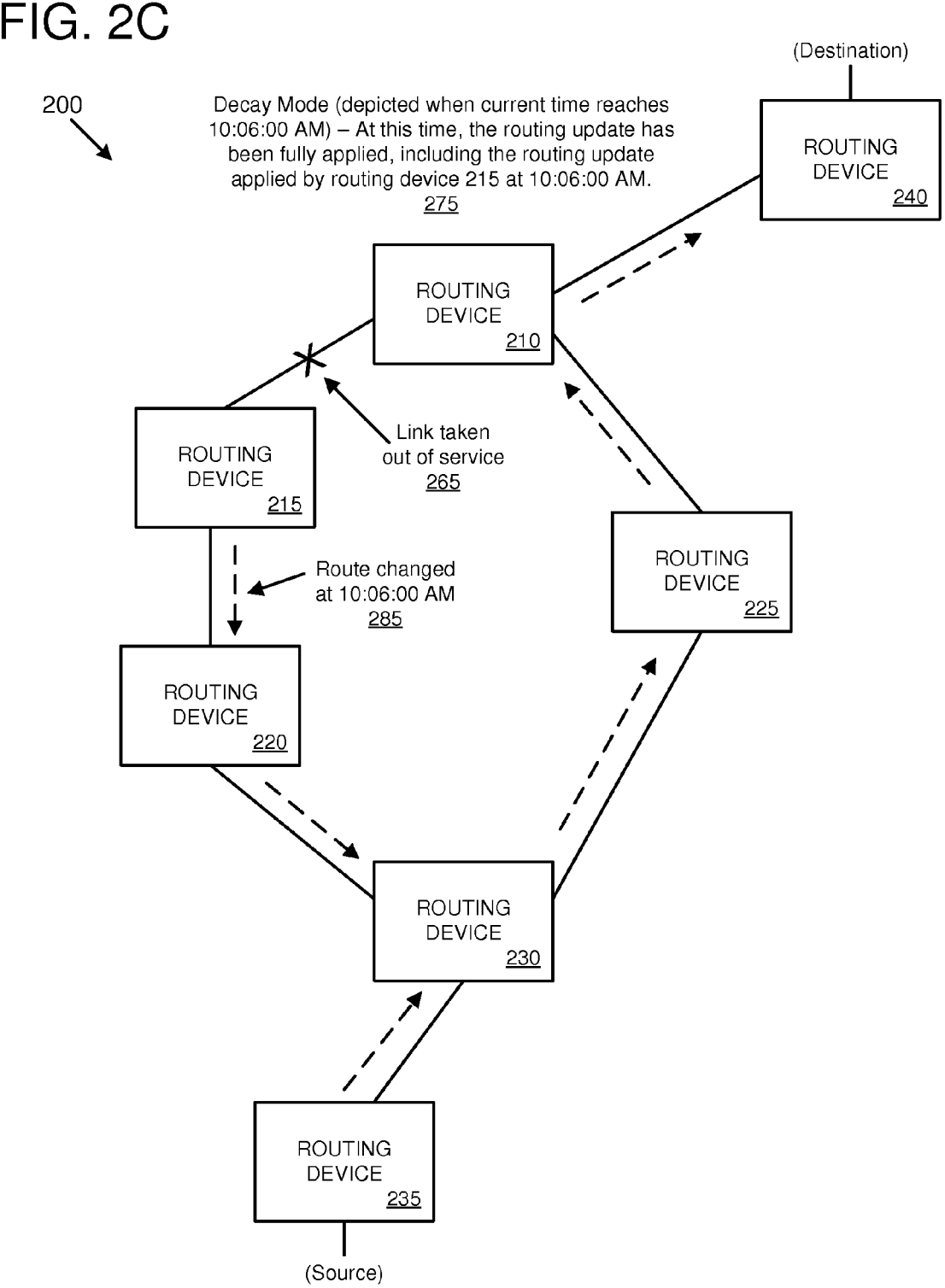

DISTRIBUTING ROUTING UPDATES ACCORDING TO A DECAY MODE

BACKGROUND

Networks, such as public and/or private networks, can be large and complicated and can have complex network topologies. Implementing changes within such large and complicated networks can be difficult. For example, implementing a change that takes a network link out of service for maintenance can lead to network traffic congestion, data loss, routing issues, and other problems.

For example, a network change may be implemented at a specific time as part of planned maintenance activity. However, the way in which the network responds to the network change may be difficult or impossible to control. For example, routing changes may happen automatically in response to the network change that can result in routing problems such as unreachable destinations and routing loops. Routing changes can also result in temporary issues caused by convergence or propagation delays.

BRIEF DESCRIPTION OF THE DRAWINGS

FIGS. 1A and 1B are diagrams of an example network environment depicting operation of a routing update according to a synchronous mode.

FIGS. 2A, 2B, and 2C are diagrams of an example network environment depicting operation of a routing update according to a decay mode.

DETAILED DESCRIPTION

Overview

Figure 2B:
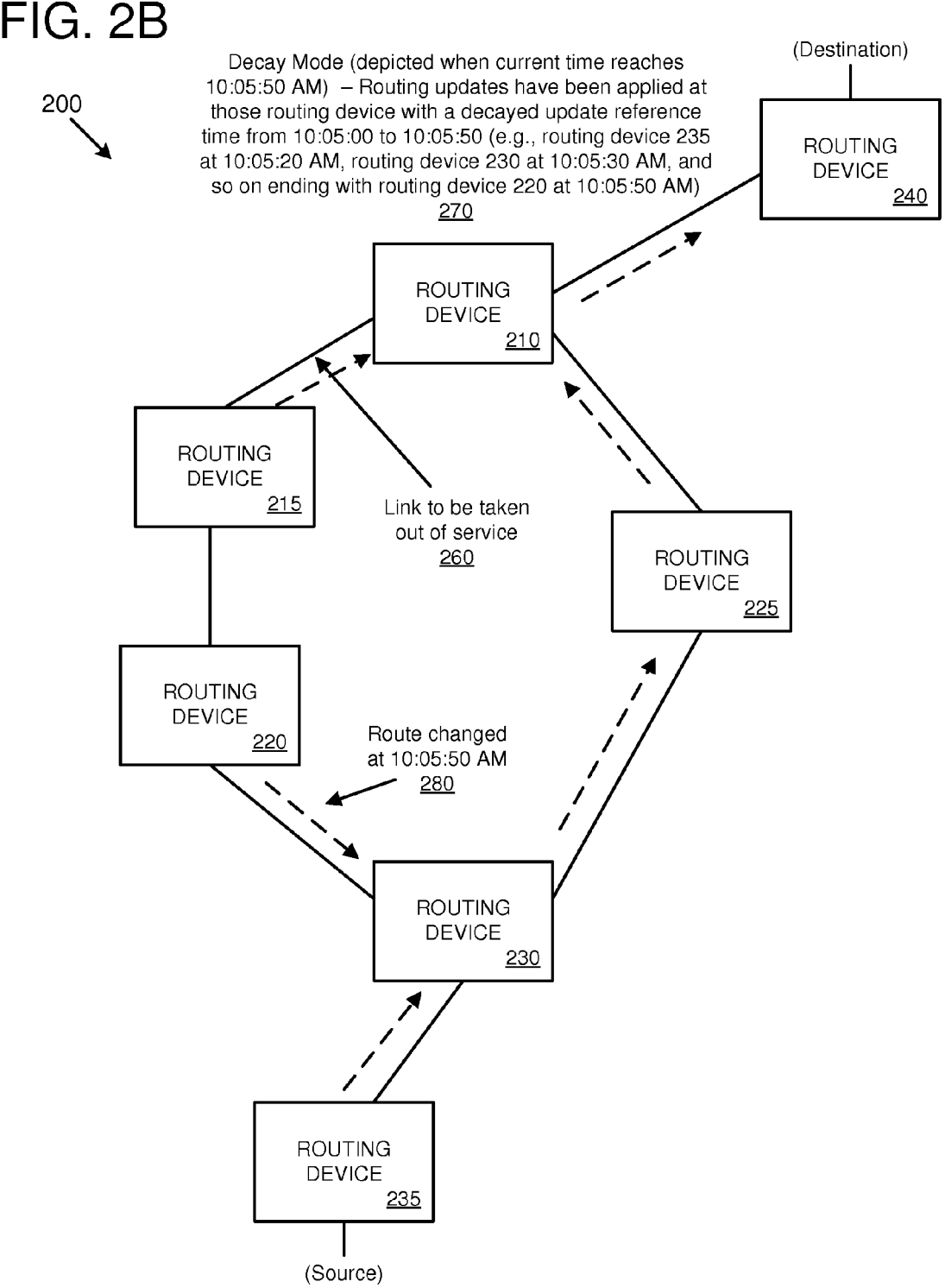

The following description is directed to techniques and solutions for distributing routing updates and using timing information to determine when to apply the routing updates. For example, an inter-device messaging protocol, such as a routing protocol or another type of message passing protocol, can support timing information (e.g., can be extended to support timing information). Routing updates that comprise timing information and that are associated with the inter-device messaging protocol can be distributed within a network environment. The routing updates can be applied to various networking devices (e.g., routing devices) within the network environment based on the timing information. For example, routing updates can be forwarded by routing devices when they are received but not acted upon until directed to do so according to the timing information contained within the routing updates. In some implementations the timing information can indicate a specific time in the future at which the routing devices are to apply the routing update. In some implementations, the timing information can indicate that the time at which the routing update is to be applied is decremented the further away a routing device is from the routing device where the update is introduced.

In a typical network environment, a routing update is applied by a given routing device as soon as the given routing device receives the routing update. This behavior can cause networking problems in certain situations. For example, routing loops can occur (e.g., micro routing loops). For example, a first routing device that receives and immediately applies a routing update may change its route to a particular network from a second routing device to a third routing device. However, the third routing device may not have received the routing update yet and may still be routing traffic for the particular network back to the first routing device. This can create a routing loop, which may exist for only a short amount of time (e.g., until the third routing device receives and applies the update) but may still cause network traffic disruption.

By distributing routing updates comprising timing information using the technologies described herein, routing updates can be applied in a coordinated or controlled manner resulting in less network traffic disruption. For example, the timing of routing updates can be controlled such that routing devices apply routing updates at the same time or at a time that varies by distance (e.g., number of hops) from the routing device to the source of the update.

Routing updates can be distributed within a network environment to implemented planned maintenance (e.g., planned network changes to be applied in the future). For example, a network link may need to be taken out of service for maintenance (e.g., to be relocated or upgraded) or a routing device may need to be upgraded or replaced. Routing updates can be introduced into the network environment to take effect at a particular time (or times) in preparation for the planned maintenance (e.g., to proactively re-route traffic before a network link or routing device is taken out of service). A network link may be taken out of service using a routing update. For example, the routing update may implement a policy change that prevents the network link from being used as a "best path" (e.g., by changing weighting so that the link is not used for network traffic).

Environments for Distributing Routing Updates Using a Synchronous Mode

In various implementations described herein, routing updates can be distributed and applied according to a synchronous mode. In the synchronous mode, routing updates are associated with timing information that comprises an update reference time. The update reference time is a specific time at which the routing devices (e.g., dedicated routers and gateways or other computing devices that perform routing functions) will apply the routing update (e.g., the computing devices that have received the routing update and have determined that the routing update will be applied). For example, a routing update may be introduced into a network environment at 9:00 AM with timing information comprising an update reference time of 9:05 AM. In this example, routing devices that have received the routing update (e.g., at some time between 9:00 AM and 9:05 AM) can apply the routing update at 9:05 AM.

FIG. 1A is a diagram of an example network environment 100 within which routing updates can be distributed. In the specific example network environment 100, distribution of a routing update according to the synchronous mode is depicted.

In the example network environment 100, a number of routing devices are shown (routing devices 110, 115, 120, 125, 130, 135, and 140) along with network connections between them (depicted as sold lines connecting the routing devices). The routing devices shown are arranged into a simplified network topology, and other types of network environment may have a different number of routing devices in a different configuration.

In FIG. 1A, the state of the example network environment 100 is depicted at a current time "c" (e.g., 10:04:00 AM). In addition, routes are depicted as dashed arrows representing network traffic flow from a particular source connected via routing device 135 to a particular destination connected via routing device 140 (e.g., from a particular source network or host to a particular destination network or host). For example, in order to reach the destination, routing device 135 sends network traffic to routing device 130, which sends network traffic to routing device 125, which sends network traffic to routing device 110, which sends network traffic to routing device 140. Routing device 120 sends network traffic to routing device 115, which sends network traffic to routing device 110, which sends network traffic to routing device 140.

As depicted at 160, a particular network connection, or "link," is being taken out of service (e.g., as a planned network change, such as for scheduled maintenance) between routing device 115 and routing device 110. In order to update routing information to account for the link being taken out of service, a routing update is introduced at routing device 115, as depicted at 150. The routing update includes timing information specifying when the routing update is to take effect. For example, the routing update may take effect at an update reference time "r" (e.g., at 10:05:00 AM where the current time "c" at which the routing update is introduced is 10:04:00 AM).

Once the routing update is introduced (as depicted at 150), the routing update is passed from one routing device to another. In some implementations (e.g., an implementation using the Open Shortest Path First (OSPF) routing protocol), the routing update is distributed among the routing devices of the example network environment 100 (e.g., among all routing devices configured to receive the routing update). For example, the routing update can be "flooded" among the routing devices of the network environment such that all routing devices receive the update (e.g., all routing devices receiving the routing update can prepare an outbound routing update to send to other connected routing devices) and any given routing device may or may not apply the routing update depending on whether it would change the given routing devices' routing behavior. In some implementations (e.g., an implementation using a distance vector protocol such as the Border Gateway Protocol (BGP) routing protocol), the routing update is distributed among routing devices that will be changing routing behavior based on the routing update. For example, a given routing device may receive the routing update and, if the routing update would change routing behavior of the given routing device, the given routing device can prepare an outbound routing update to send to other routing devices.

In the example network environment 100, the routing update comprising the timing information is passed among the routing devices, as indicated at 151 through 157. For example, routing device 115 can pass the routing update to routing device 110 (e.g., routing device 115 can prepare an outbound routing update and send the outbound routing update to routing device 110).

In FIG. 1B, the state of the example network environment 100 is depicted when the current time reaches the update reference time, as depicted at 170 (e.g., when the current time reaches 10:05:00 AM), at which time the network link is taken out of service as depicted at 165. When the update reference time is reached, the routing update is applied by various routing devices in the environment (e.g., simultaneously or nearly simultaneously due to each routing device having a synchronized current clock time maintained, for example, by a network time service). For example, at the update reference time, the routing update can be applied by each of the routing devices that have stored the routing update in their RIB. In some implementations, the routing update is put into effect by a particular routing device by propagating the routing update from the particular router's RIB to the particular router's FIB.

In FIG. 1B, once the routing update has been applied within the example network environment 100, the network path taken by network traffic from the source to the destination changes accordingly. For example, routing device 115, which previously sent network traffic bound for the destination to routing device 110, changes its rout to routing device 120. Similarly, routing device 120 changes its rout to routing device 130. The remaining routing devices do not need to update their routes based on the routing update.

Distributing routing updates according to the synchronous mode can improve network efficiency and reduce network routing problems. For example, without using the synchronous mode, each routing device may apply a routing update when it is received, and therefore each routing device in the network may apply the routing update at a different time. Applying a routing update at different times within the network can cause routing issues, such as a routing loop, and reduced efficiency (e.g., due to dropped packets if the routing update temporarily causes a destination to be unreachable by a particular routing device). With the synchronous mode, routing devices can apply the routing update at the same time, which can reduce or eliminate routing loops (e.g., micro routing loops that may occur between a small number of routing devices) and reduce or eliminate the possibility of other routing issues (e.g., unreachable destinations). For example, with reference to FIG. 1B, routing device 115 and routing device 120 can change their routes at the same time using the synchronous mode so that network traffic flows to the destination via routing device 130. Without the synchronous mode, routing device 115 and routing device 120 may form a routing loop (e.g., for a short period of time until the routing update has been received and applied).

Environment for Distributing Routing Updates Using a Decay Mode

In various implementations described herein, routing updates can be distributed and applied according to a decay mode. In the decay mode, routing updates are associated with timing information (e.g., comprising an update reference time and a timer value). In the decay mode, the time at which the routing update takes effect varies according to the distance (e.g., based on a number of hops, network latency, etc.) of a given routing device from the location where the routing update is introduced. For example, with the decay mode, timing of a given routing update can vary in inverse proportion to a distance from a routing device that originates the given routing update. This type of decay mode (where the update varies in inverse proportion to the distance) can be called a "backward" decay mode because the update is applied first by devices further away from the source. For example, a router where a routing update is introduced at 1:50 PM may apply the routing update at 2:00 PM, a router one hop away may apply the routing update at 1:59 PM, a router two hops away may apply the routing update at 1:58 PM, and so on. As another example, a router where a routing update is introduced at 1:50 PM may apply the routing update at 2:00 PM, a router with a latency (to the router where the routing update is introduced) of 10 ms may apply the routing update at 1:59 PM, a router with a latency of 20 ms may apply the routing update at 1:58 PM, and so on. With the decay mode, timing can also be varied according to other criteria, such as link bandwidth. Another type of decay mode, called a "forward" decay mode, will be discussed further below.

In some implementations, the decay mode advertises a timer value which is decremented by each routing device or "node" in inverse proportion to the distance from the routing device that originated the advertisement. In such implementations, the nodes "n" in the network environment add the timer value "t" minus a decrement value "d" to an update reference time "r" and take action (e.g., apply the routing update) in a sequence that begins at the furthest point from the source of the routing update that is allowable by the timer value (e.g., when the timer value has been decremented to zero, distribution of the routing update can be stopped). The operation of the decay mode in such implementations can be described as:

if t≠0, then action at node n=r+(t−d)

FIG. 2A is a diagram of an example network environment 200 within which routing updates can be distributed. In the specific example network environment 200, distribution of a routing update according to the decay mode is depicted.

In the example network environment 200, a number of routing devices are shown (routing devices 210, 215, 220, 225, 230, 235, and 240) along with network connections between them (depicted as sold lines connecting the routing devices). The routing devices shown are arranged into a simplified network topology, and other types of network environment may have a different number of routing devices in a different configuration.

In FIG. 2A, the state of the example network environment 200 is depicted at a current time "c" (e.g., 10:04:00 AM). In addition, routes are depicted as dashed arrows representing network traffic flow from a particular source connected via routing device 235 to a particular destination connected via routing device 240 (e.g., from a particular source network or host to a particular destination network or host). For example, in order to reach the destination, routing device 235 sends network traffic to routing device 230, which sends network traffic to routing device 225, which sends network traffic to routing device 210, which sends network traffic to routing device 240. Routing device 220 sends network traffic to routing device 215, which sends network traffic to routing device 210, which sends network traffic to routing device 240.

As depicted at 260, a particular network connection, or "link," is being taken out of service (e.g., as a planned network change, such as for scheduled maintenance) between routing device 215 and routing device 210. In order to update routing information to account for the link being taken out of service, a routing update is introduced at routing device 215, as depicted at 250. The routing update includes timing information specifying when the routing update is to take effect according to the decay mode. Using the example timing information depicted at 250, the timing information includes an update reference time "r" of 10:05:00 AM and a timer value "t" of 1 minute, with a current time "c" of 10:04:00 AM. In some implementations, a decrement value "d" of 10 seconds is included in the timing information (the decrement value can also be a default value of the extended routing protocol, a settable value stored at various routing devices, etc.). As depicted in the example network environment 200, the routing update 250 is introduced at routing device 215. Using the timing information in the routing update 250, routing device 215 can determine that the routing update will be applied by routing device 215 at 10:06:00 AM. In the implementation depicted in FIG. 2A, the timer value is not decremented until the routing update is sent to other routing devices. However, in other implementations the timer value is decremented upon receiving the routing update. In yet other implementations, decrementing the timer value can be controlled by a setting (e.g., a user-defined setting) which can indicate whether to decrement the timer value upon receiving the routing update or upon sending the routing update.

Upon receiving the routing update, routing device 215 sends the routing update (e.g., prepares an outbound routing update based on the routing update) to connected routing devices 210 and 220. As depicted at 251 and 253, when routing device 215 sends the routing update, routing device 215 decrements the timer value by the decrement value (in this case, decrements the timer value of 1 minute by 10 seconds). Routing devices 210 and 220 can then determine when to apply the routing update by adding the decremented timer value (in this case, 50 seconds), which can be called an "updated timer value," to the update reference time (in this case 10:05:00 AM) which results in the routing update being put into effect by routing devices 210 and 220 at 10:05:50 AM (which can be called a "decayed update reference time"). The routing updates are further distributed to other routing devices with decremented timer values depicted at 252, 254, 255, 256, and 257.

In some circumstances, a particular routing device can receive a routing update from more than one other routing device with different timing information. For example, routing device 230 receives the routing update with a decremented timer value (also called an "updated timer value") of 40 seconds from routing device 220 and the routing update with a decremented timer value of 30 seconds from routing device 225. In this example, routing device 230 takes the lower decremented timer value of 30 seconds and sends an outbound routing update with a decremented timer value of 20 seconds to routing device 235, as depicted at 256. Other approaches can be implemented for determining which timing information to use, such as taking the higher decremented timer value, providing a setting (e.g., a user-configurable setting) within the timing information specifying which timing information to use (e.g., the lowest or highest decremented timer value, taking the timing information based on a preferred or best path back to the origin of the routing update, etc.).

According to the decay mode, the routing update will be applied by a given routing device according to the timing information received by the given routing device (e.g., a given routing device can calculate its decayed update reference time by adding the decayed timer value to the update reference time). For example, routing device 235 applies the routing update at 10:05:20 AM, routing device 230 applies the routing update at 10:05:30 AM, routing device 220 applies the routing update at 10:05:50 AM, and so on.

With the decay mode, the decrement value can be a pre-determined value (e.g., a default value configured as part of the extended routing protocol) or a user-configurable value (e.g., configured by a network administrator and included in the timing information when the routing update is introduced). The decrement value can also be based on other metrics, such as link bandwidth (e.g., the decrement value can vary dynamically by link bandwidth of a routing device receiving or sending the routing update).

In FIG. 2B, an intermediate state of the example network environment 200 is depicted when the current time "c" reaches 10:05:50 AM, as depicted at 270. When the current time reaches 10:05:50 AM, each routing device with a decayed update reference time between 10:05:00 AM and 10:05:50 AM has applied its routing update according to its individual decayed update reference time. For example, upon the current time reaching 10:05:50 AM, routing device 220 applies its routing update which results in its route to the destination changing from routing device 215 to routing device 230, as indicated at 280.

In FIG. 2C, the final state of the example network environment 200 is depicted after the current time "c" reaches 10:06:00 AM, as depicted at 275. When the current time reaches 10:06:00 AM, the routing update has been applied by all of the routing devices (e.g., all of the routing devices for which a routing change is needed) according to each routing device's individual decayed update reference time. In some implementations, the routing update is put into effect by a particular routing device by propagating the routing update from the particular router's RIB to the particular router's FIB. As depicted at 265, the network link has been taken out of service (e.g., due to planned maintenance).

In FIG. 2C, once the routing update has been applied within the example network environment 200, the network path taken by network traffic from the source to the destination changes accordingly. Specifically, subsequent to the routing change for routing device 220 (depicted in FIG. 2B), upon the current time reaching 10:06:00 AM, routing device 215 applies its routing update which results in its route to the destination changing from routing device 210 to routing device 220, as indicated at 285. The remaining routing devices do not need to update their routes based on the routing update.

Another type of decay mode can be called a "forward" decay mode. With a forward decay mode, updates are applied first at the source and then by routing devices further away. For example, a router where a routing update is introduced at 1:50 PM may apply the routing update at 2:00 PM, a router one hop away may apply the routing update at 2:01 PM, a router two hops away may apply the routing update at 2:02 PM, and so on.

In some embodiments, a forward decay mode is implemented by incrementing a timer value (instead of decrementing a timer value as done with the backward decay mode). For example, a timer value "t" can start at zero and be incremented by an increment value "i" upon each successive hop. For example, the scenario depicted in FIG. 2A can be adjusted to use the forward decay mode by setting the timer value to zero initially and using an increment value of 10 seconds. Then, the routing update would be introduced at routing device 215, with each successive routing update incrementing the timer value by 10 seconds. For example, routing device 215 would apply the routing update at 10:05:00 AM, routing devices 210 and 220 would apply the routing update at 10:50:10 AM (the timer value "t" would be incremented by 10 seconds), and so on. In the implementation depicted in FIG. 2A, the timer value is not incremented until the routing update is sent to other routing devices. However, in other implementations the timer value is incremented upon receiving the routing update. In yet other implementations, incrementing the timer value can be controlled by a setting (e.g., a user-defined setting) which can indicate whether to increment the timer value upon receiving the routing update or upon sending the routing update.

Distributing routing updates according to the decay mode can improve network efficiency and reduce network routing problems. For example, without using the decay mode, each routing device may apply a routing update when it is received without any regard for coordinating the routing update among the various routing devices of the network, which can cause routing issues such as routing loops, reduced network efficiency, etc. With the decay mode, routing devices can apply the routing update in a coordinated fashion with the routing update being applied by routing devices furthest away from where the routing update was introduced and moving back to the source (for the "backward" decay mode) or with the routing update being applied by routing devices closest away from where the routing update was introduced and moving out from the source (for the "forward" decay mode). Whether the forward or backward mode is used can depend on what type of routing change is taking place. For example, the backward decay mode can be used when a link is taken out of service while the forward decay mode can be used when a link brought up (e.g., returned to service). In some implementations, the routing update can indicate whether to use the backward or the forward decay mode (e.g., a user-configurable setting can be provided for a network administrator to choose either the backward or forward decay mode).

Operation at Network Boundary

Depending on the details of the network environment, some routing devices may support the routing protocols described herein that have been extended to support timing information while other routing devices may not support the extended routing protocols. For example, a business that operates a network (e.g., a network environment spanning multiple data centers in multiple geographical regions) may implement an extended network protocol supporting timing information. Routing updates within the network of the business can take advantage of the timing information when applying the routing updates (e.g., for those routing devices that support the extended routing protocols). However, the network of the business may connect to other networks at the network boundary (e.g., third party networks) that do not support the extended routing protocols and/or may contain routing devices that do not support the extended routing protocols. An "edge mode" can define when and/or if routing updates are sent to routing devices that do not support such extended routing protocols.

Different techniques can be applied when distributing routing updates from a routing device or network that supports the extended routing protocols to a routing device or network that does not support the extended routing protocols. According to one technique, a given routing update is not sent to other routing devices that do not support the extended routing protocols until the routing update is applied (e.g., until the update reference time, upon which the routing update may be sent to the other routing devices with the timing information removed). According to another technique, a given routing update is sent to other routing devices that do not support the extended routing protocols upon receipt (e.g., with the timing information removed). The technique that is used can be a setting, such as a default setting (e.g., a default setting depending on whether the routing update is being performed according to the synchronous mode or the decay mode, or a user-configurable setting that can be set by a network administrator upon introducing the routing update and that may be included in the timing information).

Figure 3:
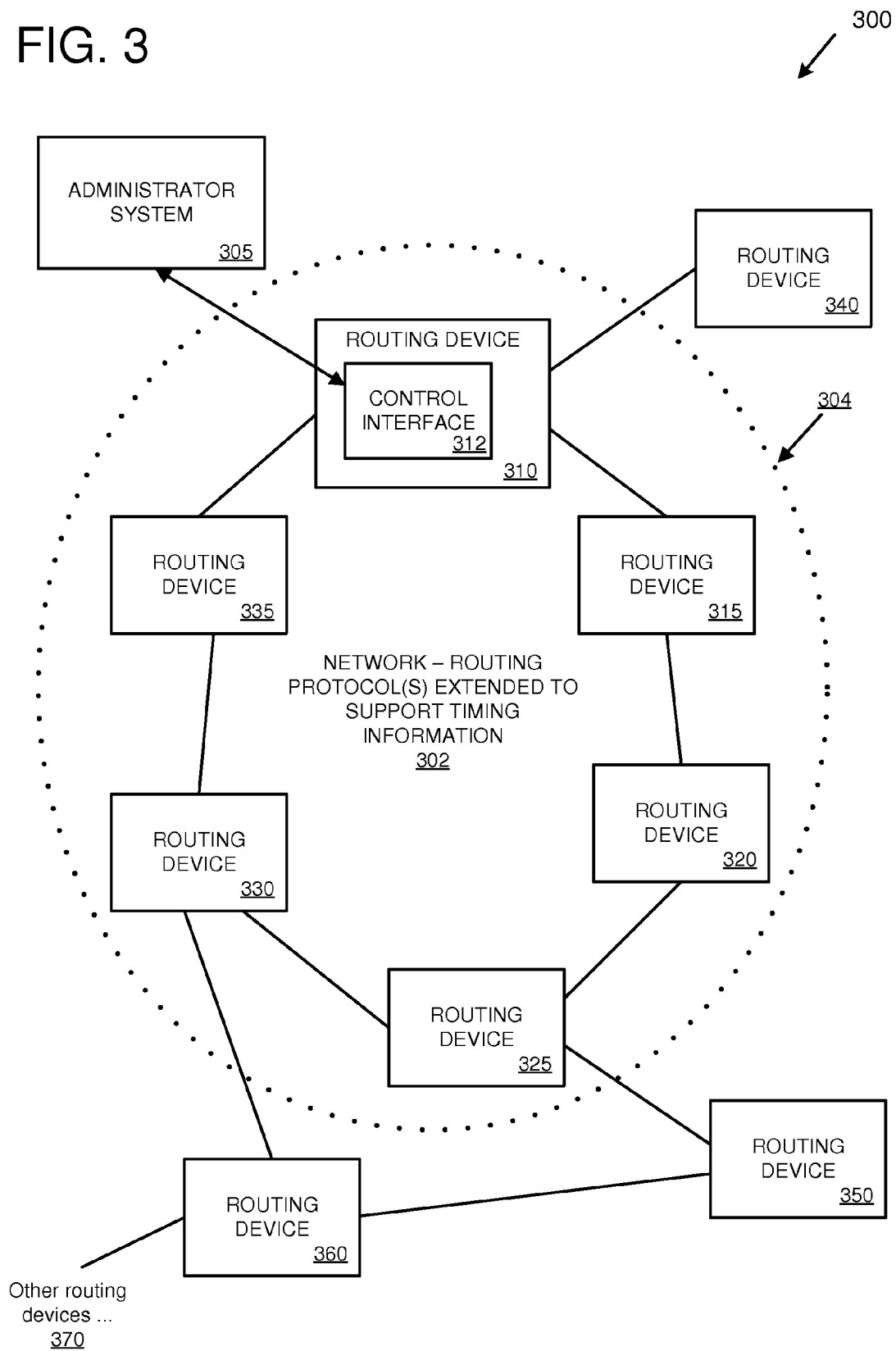
FIG. 3 is a diagram of an example network environment depicting operation of an edge mode.

FIG. 3 is a diagram of an example network environment 300 depicting operation of an edge mode that controls how routing updates are distributed between routing devices supporting timing information (e.g., routing devices configured with one or more routing protocols extended to support timing information) and routing devices not supporting timing information. Routing updates that comprise timing information can be distributed among routing devices of the example network environment 300 according to the synchronous mode and/or the decay mode.

In the example network environment 300, routing devices 310, 315, 320, 325, 330, and 335 are included within a network that supports timing information (e.g., according to a synchronous mode and/or a decay mode) as depicted at 302. In the example network environment 300, routing devices 340, 350, 360, and 370 that do not support timing information are also depicted. The network boundary 304 between routing devices supporting timing information and routing devices that do not support timing information is depicted by a dotted circle.

Routing device 310 includes a control interface 312 for receiving routing updates from an administrator system 305. Such a control interface may be included in other routing devices of the example network environment 300. Instead of, or in addition to, the control interface 312, routing updates can be introduced in other ways. For example, other computing devices (e.g., other types of networking devices, not depicted) can introduce routing updates to the example network environment 300

According to the edge mode, distribution of routing updates comprising timing information can be controlled at the network boundary 304. For example, the edge mode can comprise settings (e.g., default and/or user-configurable settings) controlling distribution of routing updates with timing information according to the synchronous mode and/or the decay mode. For example, a routing update can be introduced at routing device 310 and distributed among the routing devices within the network boundary 304 (i.e., to routing devices 310, 315, 320, 325, 330, and 335). When the routing update reaches a routing device on the network boundary 304 (e.g., an "edge routing device" that connects to a routing device on the other side of the network boundary 304), a decision can be made regarding whether and/or when to pass on the routing update.

For example, consider a routing update that is introduced at routing device 310 according to the synchronous mode with timing information comprising an update reference time of 10:05 AM (where the current time is 10:00 AM). If the edge mode specifies (e.g., as a default setting or as a user-configurable setting within the timing information) that the routing update is to be passed outside the network boundary 304 after the update reference time is reached, then the routing update will be distributed within the network boundary 304 but will be held at the edge routing devices until 10:05. For example, the routing update can be held at routing device 330 until the update reference time 10:05 AM, at which point routing device 330 can apply the routing update and send an outbound routing update (e.g., with the timing information removed) to routing device 360 (which may in turn pass the routing update on to other routing devices, such as routing devices 370).

As another example, consider a routing update that is introduced at routing device 310 according to the decay mode with timing information comprising an update reference time of 10:05:00 AM (where the current time is 10:00:00 AM), a timer value of 1 minute, and a decrement value of 10 seconds. If the edge mode specifies (e.g., as a default setting or as a user-configurable setting within the timing information) that the routing update is to be passed outside the network boundary 304 when a given routing device applies the routing update, then the routing update will be distributed within the network boundary 304 but will be held by a given routing device at the network boundary 304 until the given routing device applies the routing update. For example, the routing update can be held at routing device 330 until routing device 330 applies the routing update (for example, at 10:05:40 AM), at which point routing device 330 can apply the routing update and send an outbound routing update (e.g., with the timing information removed) to routing device 360 (which may in turn pass the routing update on to other routing devices, such as routing devices 370).

In some implementations, capability for supporting timing information (e.g., whether a particular routing device supports receiving routing updates comprising timing information and/or supports one or more routing protocols extended to support timing information) is negotiated between routing devices. For example, with reference to FIG. 3, when routing device 310 is negotiating connectivity (e.g., during link negotiation and/or protocol negotiation) to routing device 340, support for timing information can be determined. For example, routing device 310 can determine that routing device 340 does not support routing updates comprising timing information, and therefore routing device 310 can configure edge mode settings so that routing updates using timing information are held at routing device 310 (e.g., and not passed on to routing device 340 until routing device 310 applies the updates).

Putting Routing Updates into Effect

Routing updates can be received by routing devices and put into effect or applied based on timing information. For example, a routing device can receive a routing update, store the routing update (e.g., in a format that is ready to be applied to alter one or more routes maintained by the routing device), and put the routing update into effect (e.g., by altering one or more routes maintained by the routing device according to the routing update) based on the timing information.

Figure 4:
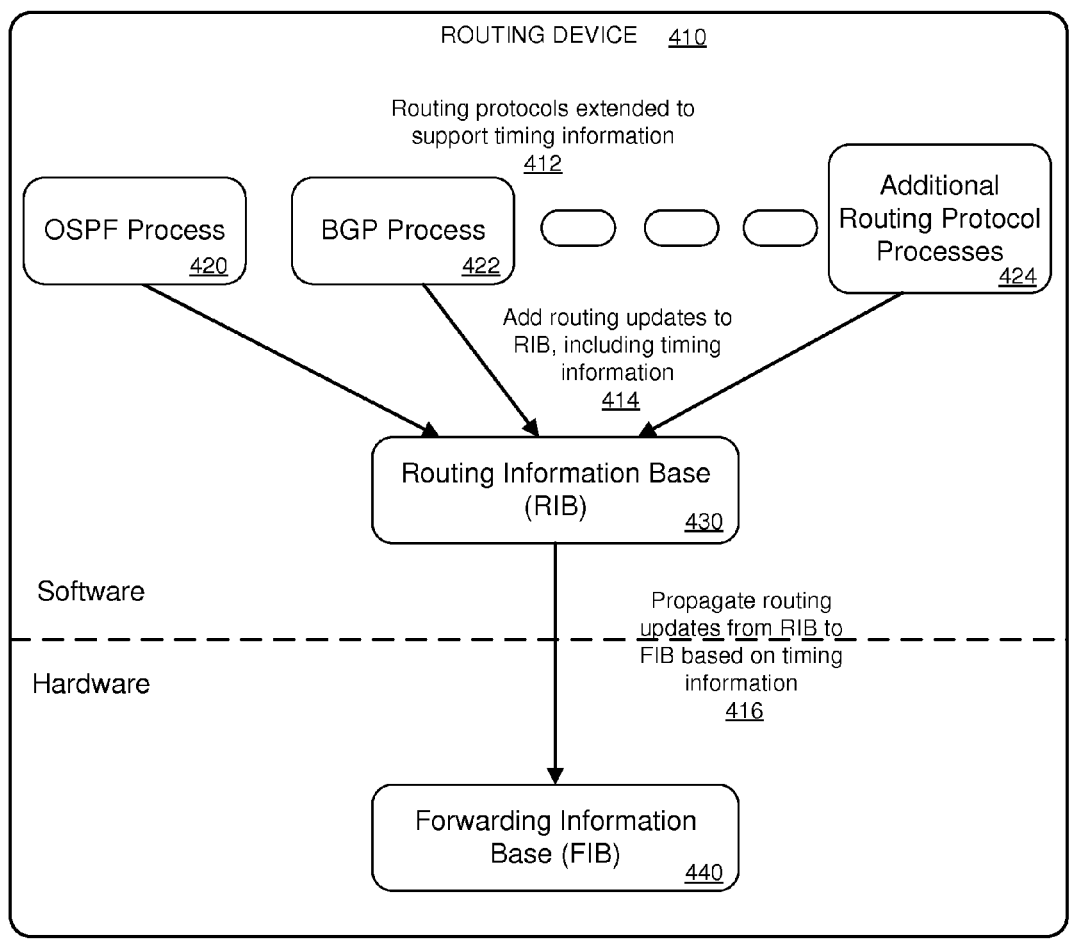
FIG. 4 is a diagram depicting am example routing device configured to apply routing updates that include timing information.

FIG. 4 is a diagram depicting am example routing device 410 configured apply routing updates that include timing information. As depicted at 412, the routing device 410 supports one or more routing protocols that have been extended to support timing information. The routing protocols that are extended can include OSPF, BGP, and/or other routing protocols.

The routing device 410 receives routing updates and handles them according to the network protocol associated with the routing update. For example, an OSPF process 420 can be provided to handle OSPF routing updates, a BGP process 422 can be provided to handle BGP routing updates, and/or other routing protocol processes 424 can be provided to handle routing updates according to other routing protocols.

If a routing update will be applied by the routing device 410, the routing update is added to the RIB 430 of the routing device 410, as depicted at 414. For example, the routing device 410 can first examine the routing update and determine if the routing update will affect any of the routes maintained by the routing device 410. If the routing update will affect one or more routes maintained by the routing device, the routing update can be added to the RIB 430.

Routing updates are stored in the RIB 430 in preparation for putting them into effect by propagating them to the FIB 440. When a routing update is received according to a routing protocol extended to support timing information, the routing update can be held in the RIB 430 until it is to be applied (e.g., at an update reference time according to the synchronous mode or at a decayed update reference time according to the decay mode), at which time it can be propagated from the RIB 430 to the FIB 440. In order to support timing information, the RIB 430 can be extended to store additional information about the pending routing update. For example, the RIB 430 can be extended to support additional fields indicating whether a particular routing update entry in the RIB 430 is to be delayed and the time at which the delayed update is to be put into effect by propagating from the RIB 430 to the FIB 440. The following table, Table 1, illustrates an extended RIB structure according to an example implementation.

TABLE 1

| IP Prefix | NextHop | UpdateDelay | UpdateTime |
|---|---|---|---|
| 10.0.00/8 | Eth0 | No | n/a |
| 10.50.0.0/16 | Eth0 | No | n/a |
| 10.100.0.0/24 | Eth1 | Yes | 20140701120000 |

In Table 1, the RIB structure has been extended with the "UpdateDelay" field that indicates whether a particular routing update is delayed and an "UpdateTime" field that indicates when a delayed update is to be put into effect (e.g., when the current clock time of the routing device 410 reaches the time indicated in the "UpdateTime" field). Table 1 depicts three example routing updates. The first two routing updates are not delayed, but the third routing update is delayed and will be applied at the time indicated by "UpdateTime" (in this example, on Jul. 1, 2014, and 12:00: 00 PM). For example, the third routing update could have been received according to the synchronous mode or the decay mode, with the "UpdateTime" field set according to the received timing information.

In some implementations, the routing device 410 performs routing protocol processing and stores the RIB 430 in software. The routing device 410 then puts routing updates into effect by propagating routing updates from the RIB 430 located in software to the FIB 440 located in hardware, as indicated at 416. Other implementations may use different arrangements (e.g., a RIB and FIB implemented in software).

In some implementations, applying routing updates by the routing device 410 allows for one or more IP prefixes and/or other routing information to be tagged such that the information is not passed from the RIB 430 to the FIB 440 until a specific time threshold has been reached (e.g., according to the synchronous mode or the decay mode). Upper layer routing calculations can be performed as normal, with only the RIB to FIB update process delayed until the update time is reached.

In some implementations, the time at which an update is transferred from the RIB to the FIB (e.g., from 430 to 440) is specific to the particular extended routing protocol being used, and different routing protocols can impose different constraints. For example, when using BGP and no recursive Interior Gateway Protocol (IGP) (i.e. unsynchronized BGP environments), routers are either route reflectors with "next-hop-self" enabled or they use per-interface next hops. When an IGP is used, either alone or "underneath" BGP, the solutions described herein can (e.g., using synchronous and/or decay mode) control the time at which the IGP specified RIB change is communicated to the FIB.

Methods for Distributing Network Routing Updates Using Timing Information

In any of the technologies described herein, methods can be provided for distributing network routing updates within a network environment using timing information according to the synchronous mode. For example, routing updates comprising timing information can be received, stored, and passed on to other routing devices.

Figure 5:
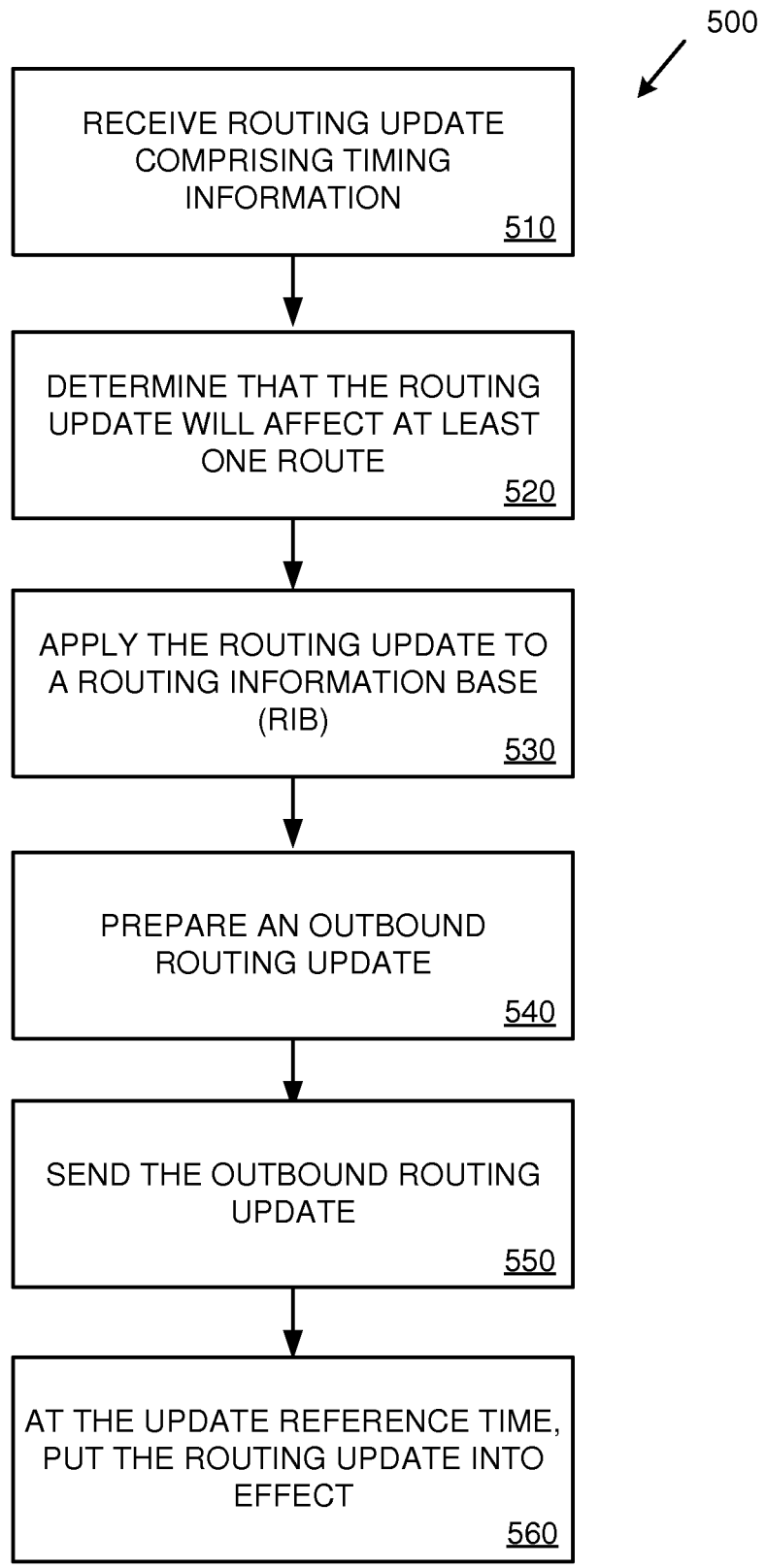
FIGS. 5, 6, and 7 are flowcharts of example methods for distributing routing updates using a synchronous mode.

FIG. 5 is a flowchart of an example method 500 implemented by a routing device for distributing routing updates within a network environment using timing information according to the synchronous mode. At 510, a routing update is received. The routing update comprises timing information including an update reference time. The routing update is received in association with a routing protocol that has been extended to support timing information (e.g., a distance vector routing protocol such as the BGP routing protocol, the OSPF routing protocol, or another routing protocol that has been extended to support timing information).

At 520, a determination is made that the routing update will affect at least one route of the routing device. For example, the routing device can check whether the received routing update will cause a change to any of its current routes (e.g., within the RIB and/or FIB) in making the determination. In some implementations, if the routing update will not affect at least one route of the routing device, the routing update is ignored or discarded. In some situations (e.g., when the routing update is received in association with a distance vector routing protocol), an outbound routing update is sent only when the routing update will affect at least one route of the routing device.

At 530, the routing update is applied to a RIB of the routing device. The routing update can be stored with the timing information indicating when the routing update is to be applied. For example, the routing update can be stored in the RIB as depicted above in Table 1, or in another format.

At 540, an outbound routing update is prepared. The outbound routing update can be the same as the received routing update. The outbound routing update can also be different from the received routing update. For example, the received routing update may cause a change to a different route stored by the routing device. The outbound routing update can indicate the different route along with the timing information from the received routing update.

At 550, the outbound routing update comprising the timing information is sent to one or more other routing devices. The outbound routing update can be sent to one or more other routing devices that support timing information (e.g., that support a routing protocol extended to support timing information). Other outbound routing updates can also be prepared and sent to other routing devices that do not support timing information (e.g., according to the edge mode). For example, sending of such other outbound routing updates can delayed until the update reference time.

At 560, the routing update is put into effect at the update reference time. Putting the routing update into effect can be performed by propagating the routing update from the RIB to the FIB of the routing device.

In some implementations, 530, 540, and 550 are performed upon receiving the routing update (e.g., performed when the routing update is received without waiting for the routing update to be put into effect at 560). In this way, the routing update can be distributed among a number of routing devices in preparation for the routing update being put into effect at the same time, which is at the update reference time.

Figure 6:
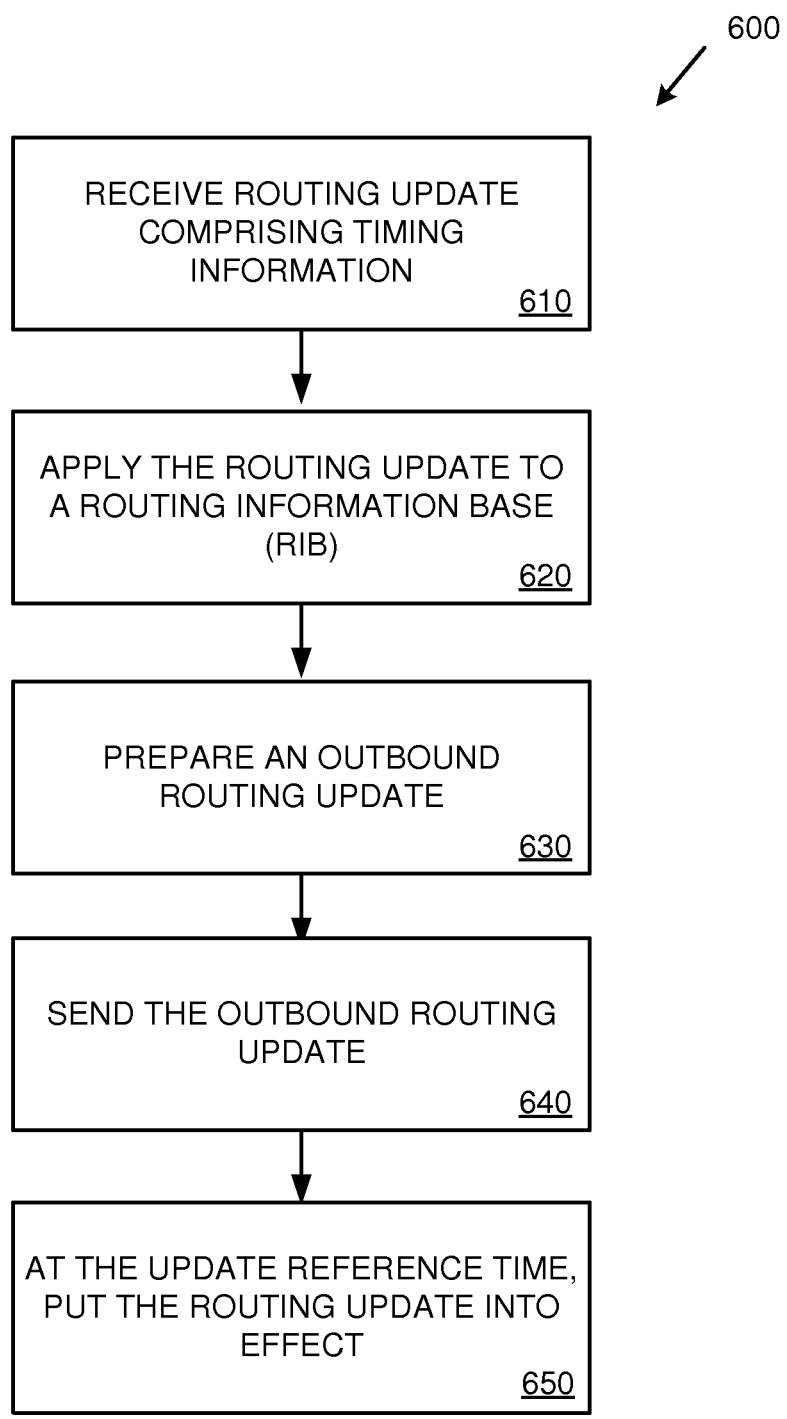

FIG. 6 is a flowchart of an example method 600 implemented by a routing device for distributing routing updates within a network environment using timing information according to the synchronous mode. At 610, a routing update is received. The routing update comprises timing information including an update reference time. The routing update is received in association with an inter-device messaging protocol that supports timing information (e.g., a routing protocol, such as a distance vector routing protocol or another routing protocol that has been extended to support timing information, or another type of message passing protocol).

At 620, the routing update is applied to a RIB of the routing device. Applying the routing update to the RIB can comprise storing routes (e.g., new or modified routes) and associated timing information in the RIB or determining that the contents of the RIB do not need to be updated based on the routing update. The routing update can be stored in the RIB as depicted above in Table 1, or in another format. In some implementations, applying the routing update to the RIB is performed upon determining that the routing update will affect at least one route of the routing device.

At 630, an outbound routing update is prepared. The outbound routing update can be the same as the received routing update. The outbound routing update can also be different from the received routing update. For example, the received routing update may cause a change to a different route stored by the routing device. The outbound routing update can indicate the different route along with the timing information from the received routing update.

At 640, the outbound routing update comprising the timing information is sent to one or more other routing devices. The outbound routing update can be sent to one or more other routing devices that support timing information (e.g., that support a routing protocol extended to support timing information). Other outbound routing updates can also be prepared and sent to other routing devices that do not support timing information (e.g., according to the edge mode). For example, sending of such other outbound routing updates can delayed until the update reference time.

At 650, the routing update is put into effect at the update reference time. Putting the routing update into effect can be performed by propagating the routing update from the RIB to the FIB of the routing device.

In some implementations, 620, 630, and 640 are performed upon receiving the routing update (e.g., performed when the routing update is received without waiting for the routing update to be put into effect at 650). In this way, the routing update can be distributed among a number of routing devices in preparation for the routing update being put into effect at the same time, which is at the update reference time.

In some implementations, such as with a distance vector routing protocol extended to support timing information, the routing update is applied and outbound routing updates are prepared and sent (e.g., as depicted at 620, 630, and 640) upon determining that the received routing update (e.g., as depicted at 610) will cause a change to one or more routes of the routing device (e.g., will cause a change to the RIB and/or the FIB). In some implementations, such as with a routing protocol that floods routing updates (e.g., the OSPF routing protocol) that has been extended to support timing information, outbound routing updates are prepared and sent (e.g., as depicted at 630 and 640) without regard to whether the received routing update (e.g., as depicted at 610) will cause a change to one or more routes of the routing device.

Figure 7:
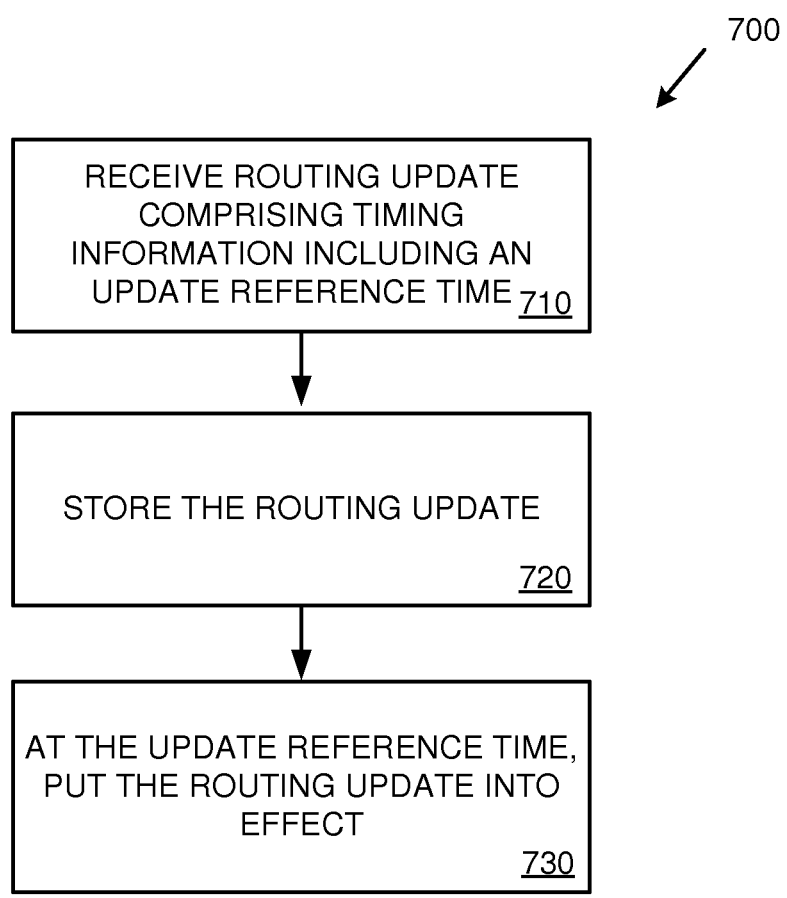

FIG. 7 is a flowchart of an example method for distributing routing updates within a network environment using timing information according to the synchronous mode. At 710, a routing update is received. The routing update comprises timing information including an update reference time. The routing update is received in association with a routing protocol that has been extended to support timing information (e.g., a distance vector routing protocol such as the BGP routing protocol, the OSPF routing protocol, or another routing protocol that has been extended to support timing information). The routing update can be received by one or more routing devices that are configured to support timing information.

At 720, the routing update is stored. For example, storing the routing update can comprise applying the routing update to a RIB (e.g., storing new or modified routes based on the routing update in association with timing information in the RIB).

At 730, the routing update is put into effect at the update reference time. Putting the routing update into effect can be performed by propagating the routing update from the RIB to the FIB of the routing device. The routing update can be put into effect at the update reference time by one or more routing devices receiving the routing update (e.g., where the one or more routing devices have determined that the routing update will affect at least one route).

In any of the technologies described herein, methods can be provided for distributing network routing updates within a network environment using timing information according to the decay mode. For example, routing updates comprising timing information can be received, stored, and passed on to other routing devices where the time at which the routing update is put into effect decreases the further away a given router is from the source of the routing update (e.g., according to various criteria such as the number of hops, the network latency, etc.).

Figure 8:
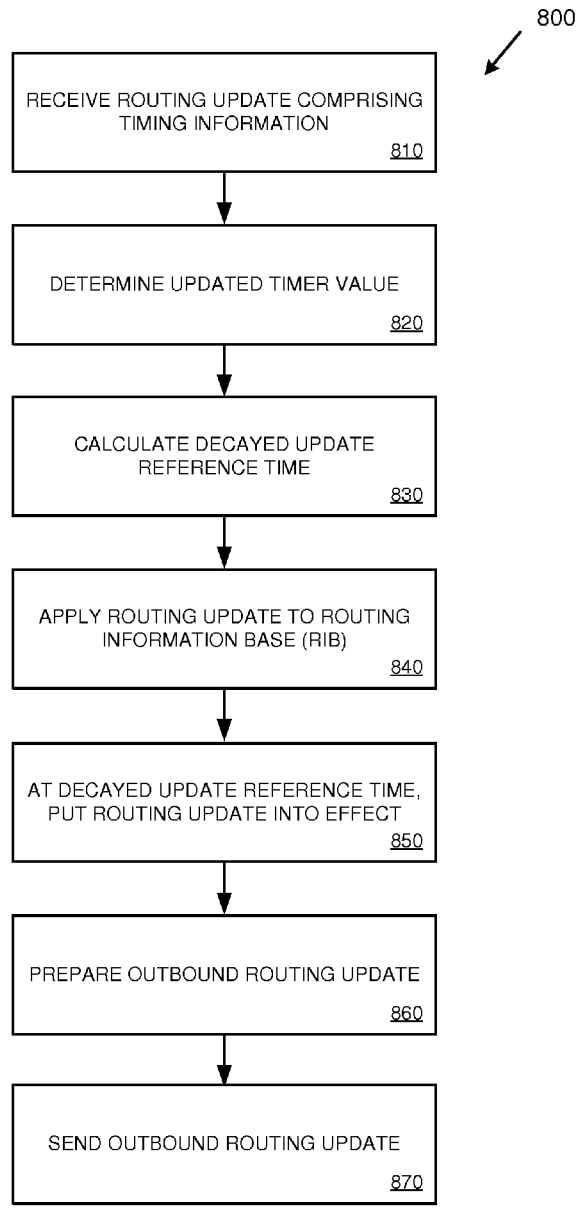
FIGS. 8, 9 and 10 are flowcharts of example methods for distributing routing updates using a decay mode.

FIG. 8 is a flowchart of an example method implemented by a routing device for distributing routing updates within a network environment using timing information according to the decay mode. At 810, a routing update is received. The routing update comprises timing information comprising a timer value and an update reference time. The routing update is received in association with a routing protocol that has been extended to support timing information (e.g., a distance vector routing protocol such as the BGP routing protocol, the OSPF routing protocol, or another routing protocol that has been extended to support timing information).

At 820, an updated timer value is determined. The updated timer value can be determined by decrementing the timer value from the timing information by a decrement value (e.g., if the timer value is 1 minute and the decrement value is 10 seconds, the updated timer value can be determined to be 50 seconds). The decrement value can be a default value or a user-configured value. The decrement value can be included in the timing information or can be configured as part of an extended routing protocol.

At 830, a decayed update reference time is calculated. The decayed update reference time can be calculated by adding the updated timer value to the update reference time (e.g., if the updated timer value is 50 seconds and the update reference time is 10:05:00 AM, the decayed update reference time can be calculated to be 10:05:50 AM).

At 840, the routing update is applied to a RIB of the routing device. The routing update can be stored with the decayed update reference time indicating when the routing update is to be applied. For example, the routing update can be stored in the RIB as depicted above in Table 1, or in another format.

At 850, the routing update is put into effect at the decayed update reference time. The routing update can be put into effect by propagating the routing update from the RIB to a Forwarding Information Base (FIB) of the routing device.

At 860, an outbound routing update is prepared. The outbound routing update comprises updated timing information comprising the updated timer value and the update reference time. The routing information in the outbound routing update can be the same as the received routing update. The routing information in the outbound routing update can also be different from the received routing update. For example, the received routing update may cause a change to a different route stored by the routing device. The outbound routing update can indicate the different route along with the updated timing information.

At 870, the outbound routing update comprising the updated timing information is sent to one or more other routing devices. The outbound routing update can be sent to one or more other routing devices that support timing information (e.g., that support a routing protocol extended to support timing information). Other outbound routing updates can also be prepared and sent to other routing devices that do not support timing information (e.g., according to the edge mode). For example, sending of such other outbound routing updates can delayed until the decayed update reference time.

In some implementations, 820, 830, 840, 860, and 870 are performed upon receiving the routing update (e.g., performed when the routing update is received without waiting for the routing update to be put into effect at 850). In this way, the routing update can be distributed among a number of routing devices in preparation for the routing update being put into effect according to each individual routing device's calculated decayed update reference time.

Figure 9:
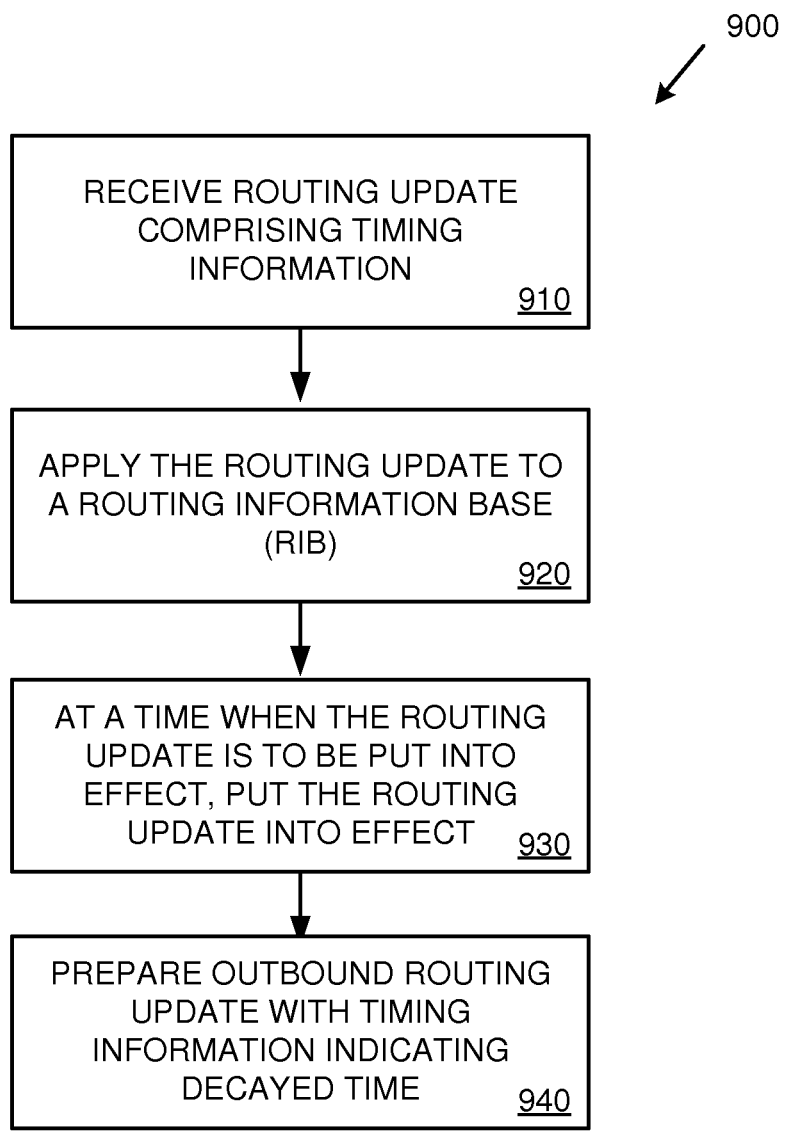

FIG. 9 is a flowchart of an example method 900 implemented by a routing device for distributing routing updates within a network environment using timing information according to the decay mode. At 910, a routing update is received. The routing update comprises timing information that indicates a time when the routing update is to be put into effect (e.g., the timing information can comprise a timer value and an update reference time). The routing update is received in association with an inter-device messaging protocol that supports timing information (e.g., a routing protocol, such as a distance vector routing protocol or another routing protocol that has been extended to support timing information, or another type of message passing protocol).

At 920, the routing update is applied to a RIB of the routing device. Applying the routing update to the RIB can comprise storing routes (e.g., new or modified routes) and associated timing information in the RIB or determining that the contents of the RIB do not need to be updated based on the routing update. The routing update can be stored in the RIB as depicted above in Table 1, or in another format. In some implementations, applying the routing update to the RIB is performed upon determining that the routing update will affect at least one route of the routing device.

At 930, the routing update is put into effect at the time indicated by the timing information. For example, the time that the routing update is to be put into effect can be calculated by adding the timer value to the update reference time. The routing update can be put into effect by propagating the routing update from the RIB to a Forwarding Information Base (FIB) of the routing device.

At 940, an outbound routing update is prepared with updated timing information indicating a decayed time. For example, the outbound routing update can be prepared by determining updated timing information indicating the decayed time and sending the outbound routing update comprising the updated timing information to one or more other routing devices. The decayed time can be determined by subtracting a decrement value from the timer value. The outbound routing update can be sent to one or more other routing devices that support timing information (e.g., that support a routing protocol extended to support timing information). Other outbound routing updates can also be prepared and sent to other routing devices that do not support timing information (e.g., according to the edge mode). For example, sending of such other outbound routing updates can delayed until the routing update is put into effect by the routing device.

In some implementations, 920 and 940 are performed upon receiving the routing update (e.g., performed when the routing update is received without waiting for the routing update to be put into effect at 930). In this way, the routing update can be distributed among a number of routing devices in preparation for the routing update being put into effect.

In some implementations, such as with a distance vector routing protocol extended to support timing information, the routing update is applied and outbound routing updates are prepared and sent (e.g., as depicted at 920 and 940) upon determining that the received routing update (e.g., as depicted at 910) will cause a change to one or more routes of the routing device (e.g., will cause a change to the RIB and/or the FIB). In some implementations, such as with a routing protocol that floods routing updates (e.g., the OSPF routing protocol) that has been extended to support timing information, outbound routing updates are prepared and sent (e.g., as depicted at 940) without regard to whether the received routing update (e.g., as depicted at 910) will cause a change to one or more routes of the routing device.

Figure 10:
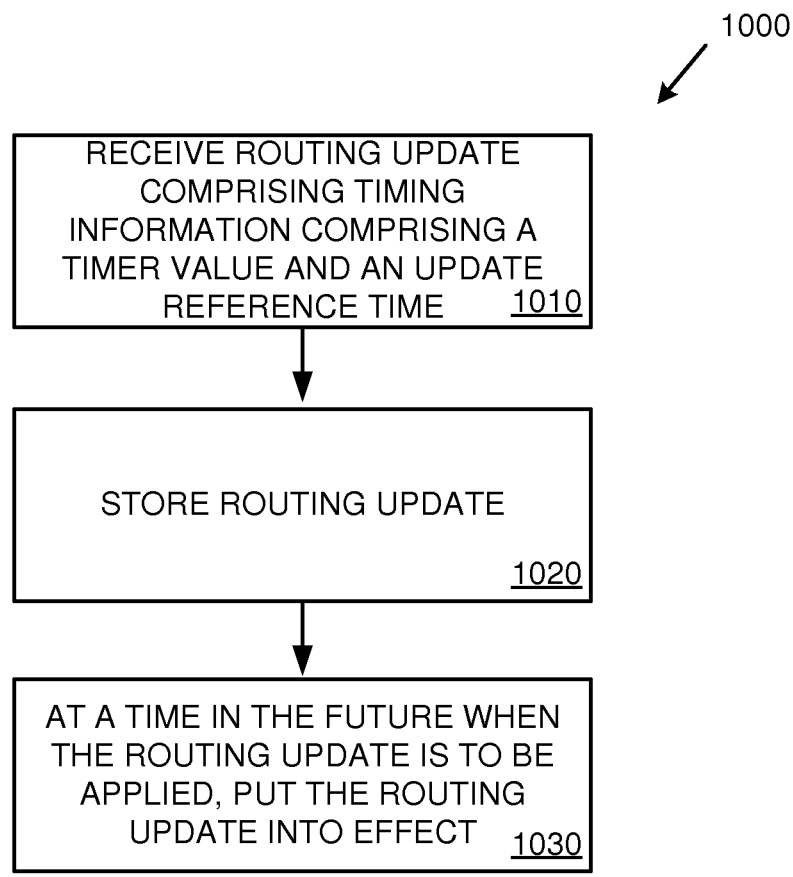

FIG. 10 is a flowchart of an example method 1000 for distributing routing updates within a network environment using timing information according to the decay mode. At 1010, a routing update is received. The routing update comprises timing information including a timer value and an update reference time used in calculating a particular time in the future when the routing update is to be applied. The routing update is received in association with a routing protocol that has been extended to support timing information (e.g., a distance vector routing protocol such as the BGP routing protocol, the OSPF routing protocol, or another routing protocol that has been extended to support timing information). The routing update can be received by one or more routing devices that are configured to support timing information.

At 1020, the routing update is stored. For example, storing the routing update can comprise applying the routing update to a RIB (e.g., storing new or modified routes based on the routing update in association with timing information in the RIB).

At 1030, the routing update is put into effect at the particular time in the future when the routing update is to be applied. Putting the routing update into effect can be performed by propagating the routing update from the RIB to the FIB of the routing device.

In the example method 1000, the timer value is decremented by a decrement value when the routing update is passed between routing devices. For example, the timer value can be decremented when the routing update is received or when updated timing information is prepared for sending an outbound routing update.

Example Computing Environments

Figure 11:
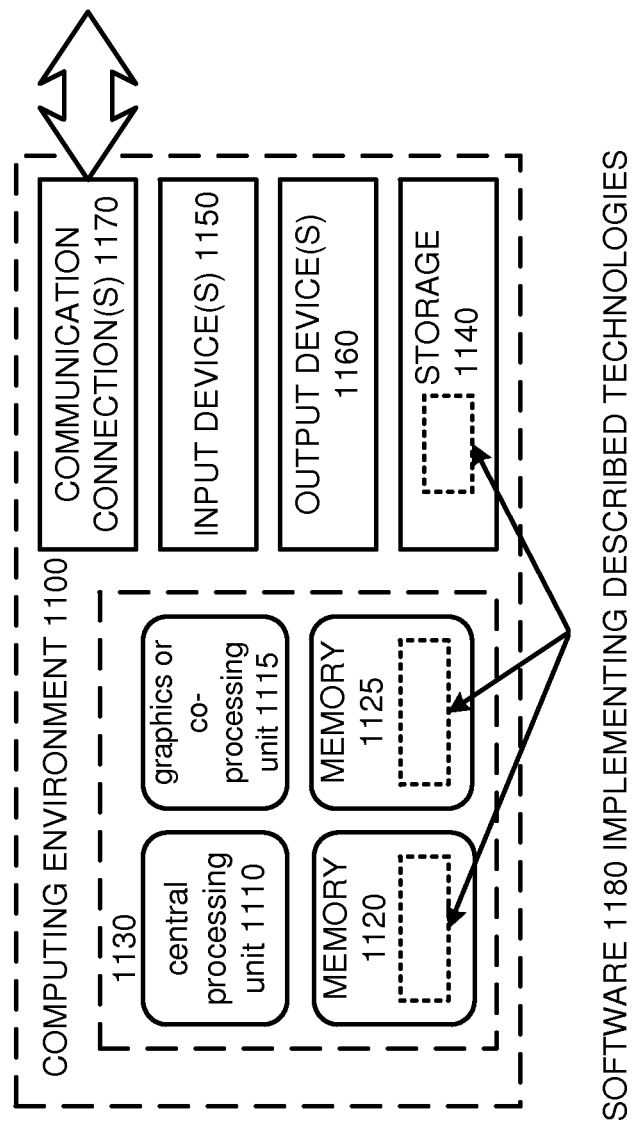
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.)

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a routing device, for distributing network routing updates within a network environment using timing information, the method comprising:
   receiving a routing update in association with a routing protocol, wherein the routing update comprises timing information, wherein the routing protocol has been extended to support the timing information, the timing information comprising a timer value and an update reference time;
   determining an updated timer value by decrementing the timer value obtained from the timing information by a decrement value;
   calculating a decayed update reference time by adding the updated timer value to the update reference time;
   applying the routing update to a Routing Information Base (RIB) of the routing device;
   at the decayed update reference time, putting the routing update into effect by propagating the routing update from the RIB to a Forwarding Information Base (FIB) of the routing device;
   preparing an outbound routing update based on the received routing update, wherein the outbound routing update comprises updated timing information comprising the updated timer value and the update reference time; and
   sending the outbound routing update comprising updated timing information to one or more other routing devices.

2. The method of claim 1 wherein distributing the network routing updates within the network environment operates according to a decay mode in which timing of implementation of a given routing update varies in inverse proportion to a distance from a routing device that originates the given routing update.

3. The method of claim 1 wherein the decrement value is a user-configurable value that is included in the timing information.

4. The method of claim 1 wherein the one or more other routing devices are configured to support the timing information, and wherein the outbound routing update is prepared and sent upon receiving the routing update, the method further comprising:
   for one or more other routing devices not configured to support the timing information:
      preparing a second outbound routing update for the one or more other routing devices not configured to support the timing information, wherein the second outbound routing update does not comprise the timing information; and
      at the decayed update reference time, sending the second outbound routing update to the one or more other routing devices not configured to the support the timing information.

5. The method of claim 1 wherein the routing protocol is a distance vector protocol, and wherein the applying the routing update, the putting the routing update into effect, the preparing an outbound routing update, and the sending the outbound routing update are performed upon determining that the routing update will cause a change to the RIB.

6. The method of claim 1 wherein the routing protocol is one of:
   a Border Gateway Protocol (BGP) routing protocol that is extended to support the timing information; or
   an Open Shortest Path First (OSPF) routing protocol that is extended to support the timing information.

7. The method of claim 1 wherein the routing update comprises an Internet Protocol (IP) prefix, and wherein applying the routing update to the RIB comprises:
   storing the IP prefix in the RIB in association with the decayed update reference time.

8. A computer-readable storage medium storing computer-executable instructions for causing a routing device to perform operations for distributing network routing updates within a network environment using timing information, the operations comprising:
   receiving a routing update in association with an inter-device messaging protocol, wherein the routing update comprises the timing information, the timing information indicating a time when the routing update is to be put into effect, wherein the timing information comprises a timer value and an update reference time;
   upon receiving the routing update, applying the routing update to a Routing Information Base (RIB) of the routing device;
   at the time when the routing update is to be put into effect, putting the routing update into effect by propagating the routing update from the RIB to a Forwarding Information Base (FIB) of the routing device, wherein the time when the routing update is to be put into effect is calculated by adding the timer value to the update reference time;
   preparing an outbound routing update based on the received routing update, comprising:
      determining updated timing information indicating a decayed time when the routing update is to be put into effect, wherein the decayed time is indicated, at least in part, by subtracting a decrement value from the timer value; and
      sending the outbound routing update comprising the updated timing information to one or more other routing devices.

9. The computer-readable storage medium of claim 8, wherein the one or more other routing devices are configured to support the timing information, and wherein the outbound routing update is prepared upon receiving the routing update, the method further comprising:
   for one or more other routing devices not configured to support the timing information:

preparing a second outbound routing update for the one or more other routing devices not configured to support the timing information, wherein the second outbound routing update does not comprise the timing information; and at the time when the routing update is to be put into effect, sending the second outbound routing update to the one or more other routing devices not configured to support the timing information.

10. The computer-readable storage medium of claim 8 wherein the inter-device messaging protocol is a Border Gateway Protocol (BGP) routing protocol that is extended to support the timing information.

11. The computer-readable storage medium of claim 8 wherein the inter-device messaging protocol is an Open Shortest Path First (OSPF) routing protocol that is extended to support the timing information.

12. The computer-readable storage medium of claim 8 wherein the routing update is received as part of a planned routing change to be effective after a current time at which the routing update is received.

13. A network system comprising:
a plurality of routing devices configured to use one or more network routing protocols configured to support timing information according to a decay mode, wherein the decay mode is a forward decay mode;

the plurality of routing devices configured to perform operations for distributing network routing updates within the network system using the one or more network protocols configured to support the timing information, the operations comprising:
receiving a routing update comprising the timing information, the timing information comprising a timer value and an update reference time used in calculating a particular time in the future when the routing update is to be applied;

storing the routing update comprising the timing information; and at the particular time in the future when the routing update is to be applied, putting the routing update into effect;

wherein the timer value is incremented by an increment value when the routing update is passed between routing devices of the plurality of routing devices;

wherein the timer value is incremented by the increment value upon each successive hop from a routing device, of the plurality of routing devices, which is a source of the routing update to a current routing device, of the plurality of routing devices, receiving the routing update.

14. The network system of claim 13 further comprising:
a plurality of other routing devices that are not configured to support the one or more network routing protocols configured to support the timing information; and the operations further comprising:
at the particular time in the future when the routing update is to be applied, sending an outbound routing update based on the routing update to one or more of the plurality of other routing devices, wherein the outbound routing update does not comprise the timing information.

15. The network system of claim 13 wherein storing the routing update comprises:
applying the routing update to a Routing Information Base (RIB).

16. The network system of claim 13 wherein the one or more network routing protocols comprise one or more of:
a Border Gateway Protocol (BGP) routing protocol that is configured to support the timing information; or
an Open Shortest Path First (OSPF) routing protocol that is configured to support the timing information.

\* \* \* \* \*